Oct. 2, 1928.　　　　　　　　　　　　　　　　　　1,686,438
F. B. COCKBURN
FACING ATTACHMENT FOR LATHES
Filed Dec. 5, 1925　　　2 Sheets-Sheet 1

Inventor:
Francis B. Cockburn
By Wood & Wood
Attorneys

Oct. 2, 1928.

F. B. COCKBURN 1,686,438

FACING ATTACHMENT FOR LATHES

Filed Dec. 5, 1925   2 Sheets-Sheet 2

Inventor:
Francis B. Cockburn

By Wood & Wood
Attorneys

Patented Oct. 2, 1928.

1,686,438

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

FACING ATTACHMENT FOR LATHES.

Application filed December 5, 1925. Serial No. 73,505.

This invention relates to improvements in facing attachments for lathes such attachments being used where it is desired to advance a tool longitudinally of the lathe to perform the usual turning operation, and at the same time to feed a second tool transversely of the lathe to perform a grooving or facing operation.

It is also desirable that the feed of the transversely operating facing tool be synchronized with a carriage movement, and the present invention relates to simplified means for imparting feed movement to the transversely operating tool by motion of the lathe carriage.

An important feature of the invention resides in the provision of a rocking arm having a tool at one end and a templet wheel at the other, the rockable arm being pivoted at an intermediate point, and the tool and templet wheel being mounted at respective opposite sides of the pivot.

Another feature of the invention is a provision of means for micrometric longitudinal adjustment of a non-rotatable pivotal support of a rocking arm as a facing tool carrier.

Another feature of the invention includes the more accessible positioning of the templet or profile bar upon the outermost surface of the rear face of the carriage, the templet thus being placed in the most accessible position so that substituted templets may be conveniently attached.

Another feature of the invention resides in provision of a rock arm mounted upon the top of the lathe bed and adapted to function as a tool carrier and templet engaging member, with the templet engaging end of the rock arm weighted for holding the same against the templet, thus providing a gravity controlled, rocking tool carrier.

Another feature of the inventon is the placing of the tool engaging face of the templet longitudinally of the machine instead of at right angles to the same, as in cases where cams are used.

Other objects and certain advantages will be more fully set forth in the description of the accompanying drawings forming a part of this specification, in which.

Figure 2:
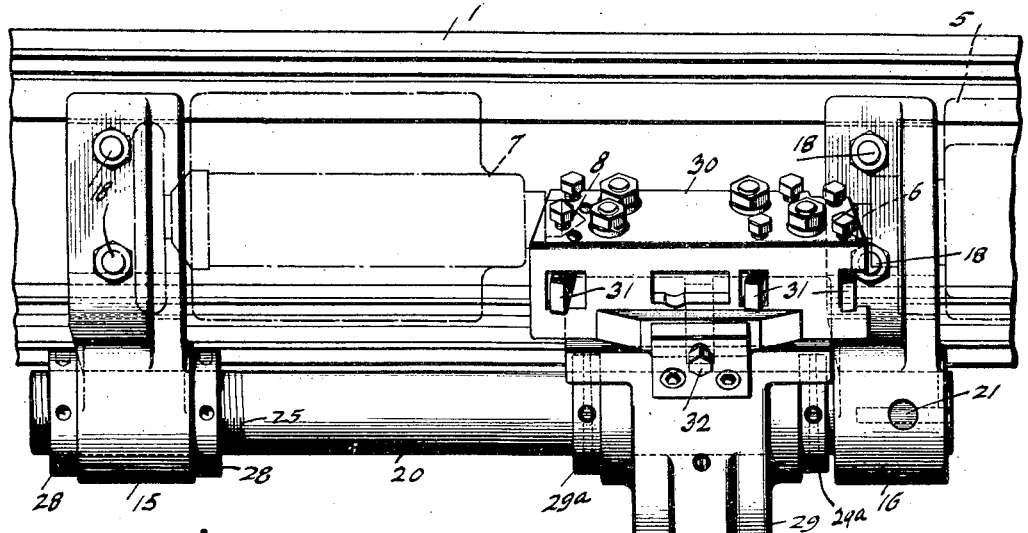
Figure 2 is a plan corresponding to Fig. 1.
Figure 1:
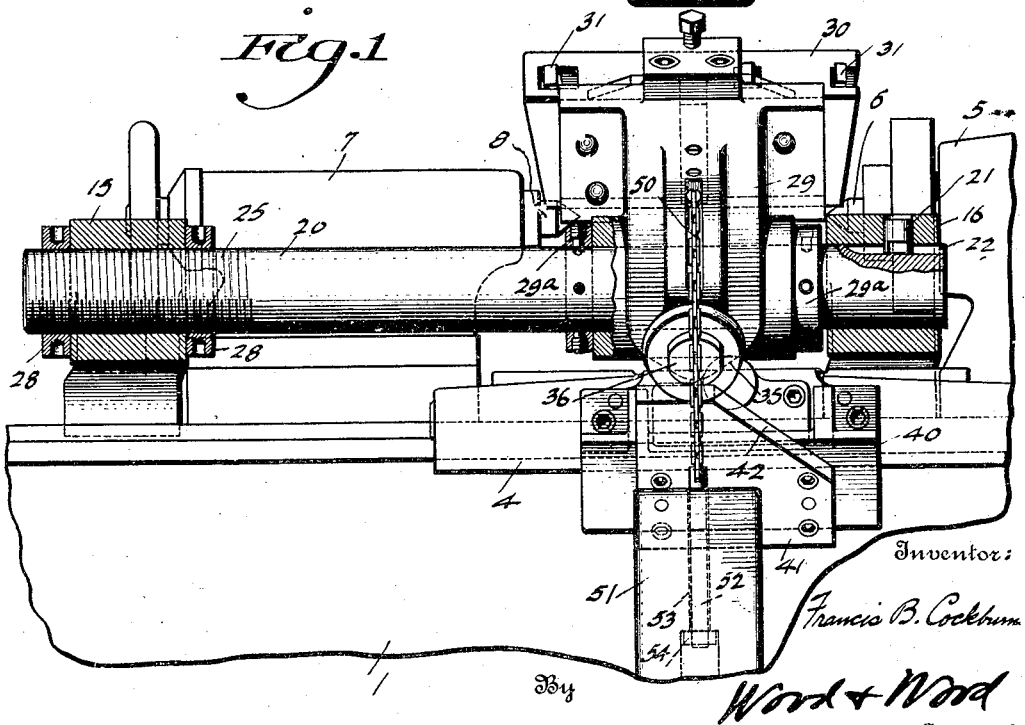
Figure 1 is a side elevation of the rear of a lathe, equipped with my improved back facing attachment, and showing a tool raised.
Figure 3:
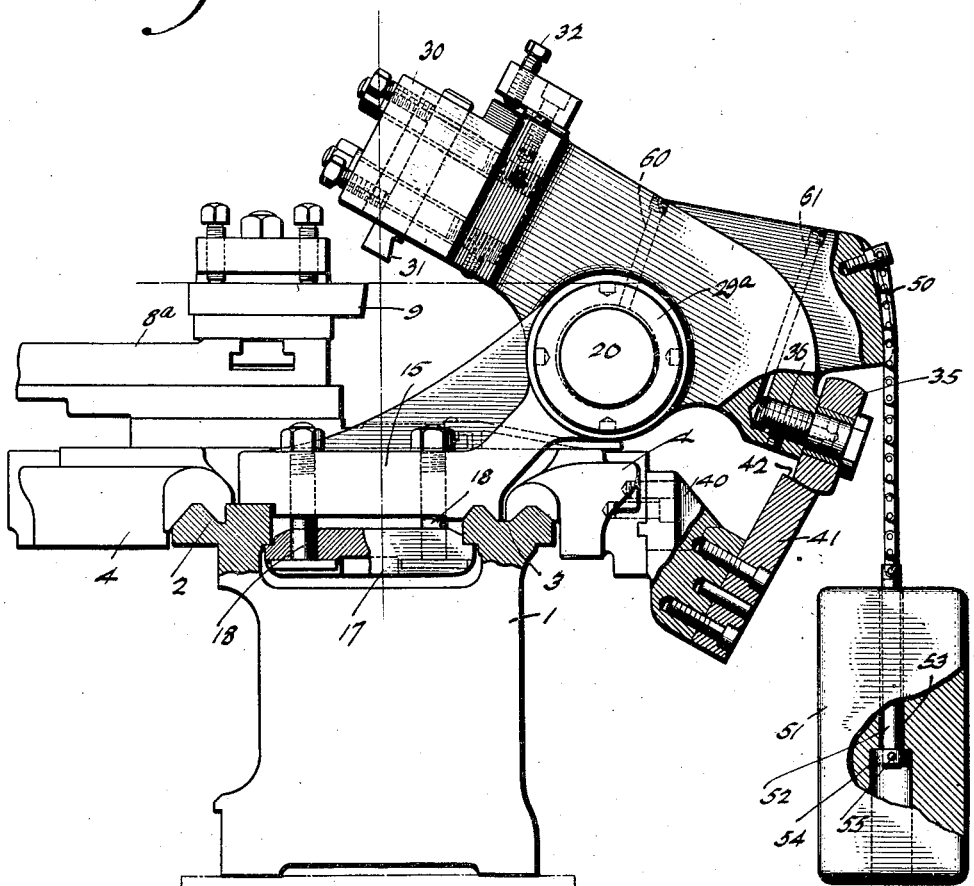
Figure 3 is an end view of the lathe and attachment with the guide rails of the lathe bed in section.
Figure 4:
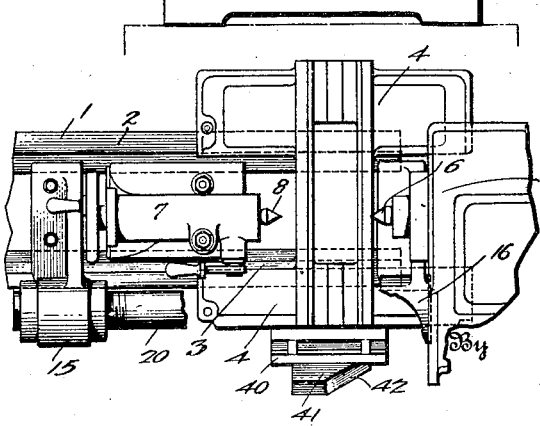
Figure 4 is a diagrammatic plan view showing how the templet is mounted upon the carriage.

The bed of a lathe is generally indicated at 1, said bed having front and rear guide rails 2, 3. Upon the bed is slidably mounted a carriage 4 having guide ribs engaged with the rails 2, 3, to provide for sliding movement of the carriage. Mounted also upon the bed is a head stock 5 having a work carrying spindle 6, and opposite the head stock is a tail stock 7 having a tail stock spindle 8, the members 5 and 7 forming means for supporting work between centers and for rotating work. Mounted on the carriage is a tool carrier 8$^a$ having a tool 9 adapted to engage and operate upon the work in the ordinary manner.

Attached upon the bed and adjustable lengthwise thereof, are two brackets 15, 16, each having a clamping plate 17 engaging below undercut portions of the rails 2 and 3, and further having bolts 18 for drawing the clamping plate upwardly to set and hold the brackets in any desired adjusted position upon the bed.

The brackets provide bearings for a pivot shaft 20 which is engaged through both the bearing openings, and said shaft is held therein against rotative movement by a pin 21 engaging in a longitudinal key-way 22. The opposite end of the shaft is threaded as at 25, and engaged with these threads respectively at opposite sides of the bracket 15 are jam nuts 28 adapted to longitudinally adjust the shaft in micrometric degree when loosened and rotated. In this way the pivot shaft can be longitudinally adjusted but is non-rotatable.

Mounted for rocking movement at an intermediate point on the shaft 20, is a rock arm 29 adapted to function as a tool carrier and templet engaging member, and constituting a back facing arm pivoted at an intermediate point, and adapted to rock toward and away from the work. Translative movement of the rock arm is prevented by collars 29$^a$.

This arm may be of any preferred contour so that it is constituted a rockable tool carrier, and upon the front of the arm is mounted a tool support 30 having a tool or tools 31, in this instance adapted to engage the terminal and intermediate portions of the work for facing operations. The tool holder 30 is slidable upon the end of the arm and a screw 32 permits the tool holder to be forced forwardly toward the work for adjustment purposes. At the opposite end of the arm is mounted a roller 35 the axis of the roller being disposed substantially longitudinally of the rockable facing tool carrier.

Attached to the rear face of the carriage 4 is a bracket 40, and removably attached to the rear face of this bracket is a templet or profile bar 41 having a wheel engaging face 42 of the proper contour, disposed longitudinally of the work and bed and facing upwardly. The templet is thus movable with the carriage, and inasmuch as the carriage movement is synchronized with the work through the head stock gearing, the movement of the templet is also synchronized.

It will be noted that the templet is placed on the outer surface or rear face of the carriage in a readily accessible position and thus can be readily replaced or adjusted. It will be understood that the contour of the templet will correspond to the character of the cut desired, so that templets of different shape will be used, conformably to the character of the facing operation.

In order to force the roller 35 against the templet and to hold the same positively engaged therewith throughout a facing operation, the rockable tool carrier arm is weighted at that end upon which the roller is carried and in this instance I employ a chain 50 having a weight 51 at the lower end, the chain being attached at its lower end to a pin 52 which traverses a counter-bored opening 53 of the weight, and a collar 54 is attached by a pin 55 to secure the pin slidable within the opening of the weight. Suitable oil channels 60, 61, lead downwardly from the top of the rockable tool carrier respectively to the shaft 20 and to the screw pivot 36 of the roller 35.

Inasmuch as a templet moves with the carriage, and inasmuch as the rockable arm is stationary and non-movable longitudinally, the engagement between the templet and the roller 35 of the arm insures a synchronized rocking motion for feeding the tool toward and into the work.

The longitudinal adjustability of the shaft 20 permits adjustment to be made between the tool carried by the tool facing arm and the work, longitudinally of the work, and the adjustability of the tool carrier 30 across the long axis of the rockable arm permits of setting the tool exactly to obtain the proper length of feed at an angle to the rotative axis of the work.

It will be noted that the pivot shaft or bar 20 spans the carriage and each terminal of the bar is supported by a bracket, one lying at each side of the carriage and attached to the top of the bed. The brackets are attached to guide rails of the bed, and are aligned in direction of carriage travel and spaced sufficiently to permit longitudinal travel of the carriage therebetween. The bar or pivot shaft, spanning the carriage, is translatably non-rotatively supported in the brackets. The said bar is further threaded at one end with the threads disposed at opposite sides of one of the brackets, and collars are provided one at each side of said bracket having threaded engagement with the threads of the shaft for translating the bar, when one or the other are rotated in an appropriate direction, and for locking the bar against translation in an adjusted position after translation.

Having described my invention, I claim:

In combination with a lathe including a bed, and work supporting centers on the bed, a carriage operable between the work supporting centers, brackets upon the top of the bed on each side of the carriage aligned in direction of carriage travel and spaced to permit travel of the carriage therebetween, a pivot shaft spanning the carriage and translatably non-rotatively supported in the brackets, said bar threaded at one end with the threads disposed at opposite sides of the brackets, collars one at each side of said bracket having threaded engagement with the threads of the pivot shaft for translating the shaft when the collars are turned, said collars engageable with opposite sides of the bracket for locking the pivot shaft against translation in an adjusted position, an arm non-translatably pivoted at intermediate point upon the non-rotatable pivot shaft, said arm having a tool engageable with the work carried between the centers and further having a roller at the opposite end, said tool and roller respectively at opposite sides of the pivot, a templet movable with the carriage having a longitudinally disposed face, engageable by the roller for rocking said arm for a tool feed movement in synchronism with carriage movement.

In witness whereof, I hereunto subscribe my name.

FRANCIS B. COCKBURN.